July 17, 1934.  L. V. AGEE  1,967,002
BICYCLE BASKET
Filed April 7, 1934
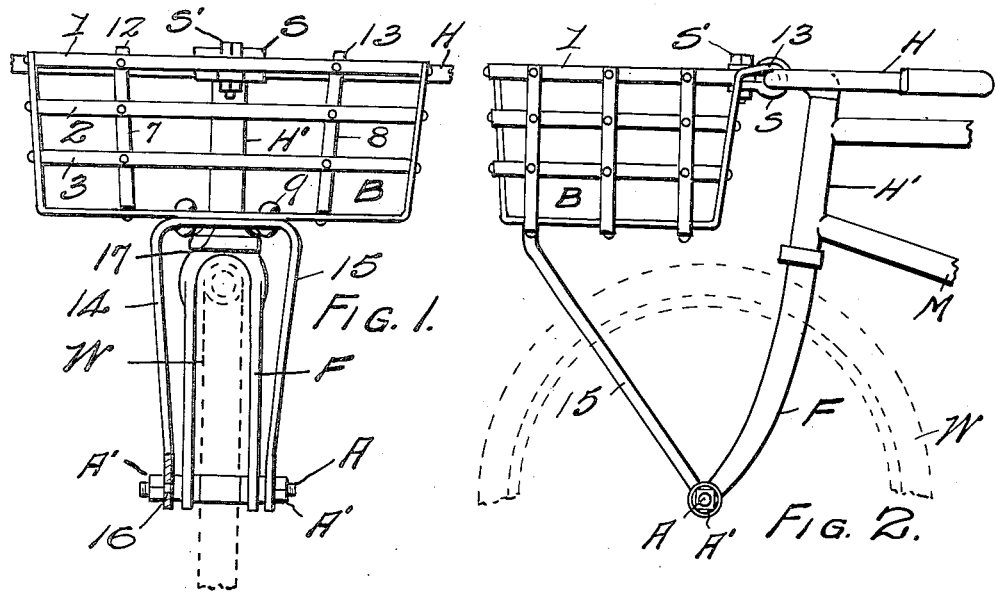
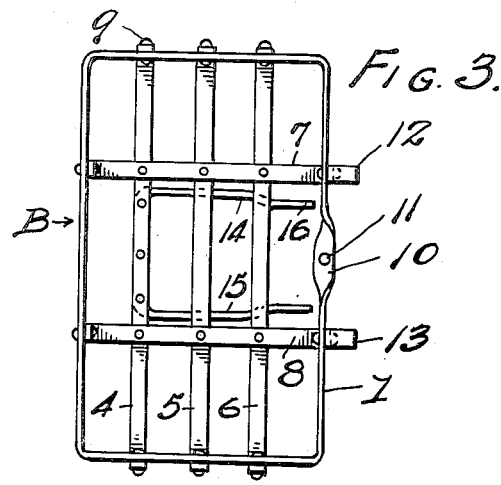
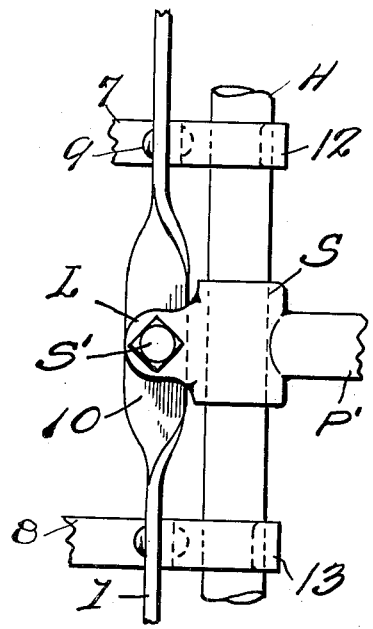
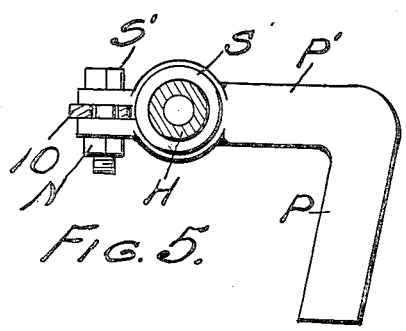
Inventor
LEWIS V. AGEE
By Thomas R. Harney
Attorney Patented July 17, 1934

1,967,002

UNITED STATES PATENT OFFICE 1,967,002

BICYCLE BASKET

Lewis V. Agee, Richmond, Va., assignor to Mary A. Mullan, Richmond, Va.

Application April 7, 1934, Serial No. 719,531

3 Claims. (Cl. 224—32)

My present invention relates to an improved bicycle basket especially designed and adapted for use at the front of a bicycle, and readily attached thereto, for convenience as a carrier for various articles, commodities, tools, provisions &c.

The primary object of the invention is the provision of a basket-carrier which is comparatively light in weight but strong and durable; which may be manufactured at a low cost of production; and which may with facility be attached to the standard type of bicycle without necessity for use of special tools or devices, and also without requiring expert mechanical ability in assembling and attaching the parts.

In attaching the basket to the bicycle I employ means whereby the basket is rigidly joined or fastened to the handle bar and to the front axle-bolt of the bicycle, in such manner as to convert the attachment into a component part of the bicycle. The parts of the basket are rigidly joined, and the basket is rigidly fastened and braced in its relation to the bicycle in order that parts will not work loose under vibrations and strains, thereby preventing rattling and displacement of parts.

With the above ends in view the invention consists in certain novel combinations and arrangements of parts as will hereinafter be more fully set forth and claimed. In the accompanying drawing I have illustrated one complete example of the physical embodiment of my invention wherein the parts are combined and arranged according to the best mode I have thus far devised for the practical application of the principles of my invention, but it will be understood that changes and alterations may be made in the exemplified structure within the scope of my claims, without departing from the principles of my invention.

Figure 1 is a front view of a portion of a standard type of bicycle equipped with the basket of my invention.

Figure 2 is a side view at the front of the bicycle, as seen from the right in Figure 1.

Figure 3 is a top view of the basket, detached.

Figure 4 is a top plan view of part of the basket showing its attachment to the handle bar of the bicycle.

Figure 5 is a side view of the bicycle-post and clamp, with the handle-bar and a portion of the basket in section.

In order that the general arrangement and relation of parts may readily be understood I have indicated in Figures 1 and 2 a standard type of bicycle having the usual handle-bar H, the post P in the frame-head H' of the main frame M, and the front fork F of the wheel W, the latter being shown in dotted lines. The axle for the wheel is designated A and the two fastening nuts are A'. The post P is provided with the usual arm P', and this arm terminates in the split clamp sleeve S having perforated lugs L, and the bolt S' is employed to clamp the sleeve on the handle-bar, the usual nut N being used on the bolt for that purpose.

The basket-carrier, which is indicated as a whole by the letter B, is preferably of substantially rectangular shape, fashioned from straps of any suitable metal which is characterized by strength and lightness in weight, and may be made in any appropriate size.

The basket, in the form of a skeleton frame, comprises the three horizontal straps 1, 2, and 3, together with the longitudinally extending straps 4, 5, and 6, and the two cross straps 7 and 8, all of which are bent to shape to form the sides, ends, and bottom of the basket. It will be understood of course that the number of metal straps employed may be varied to suit different purposes, and the size and shape of the metal straps may also be varied.

In the drawing the basket is made of flat metal straps which contact closely one with another, so that intersections and junctions of the straps may be rigidly and securely fastened against relative movement. Various means may be employed for fastening adjoining straps together, as for instance the rivets 9, which pass through the jointed straps, and are headed, to provide a tight joint, by means of which a rigid, non-rattling, structure is provided for the basket. These permanently tight joints provided by the rivets prevent the joints from working loose under vibrations and strains transmitted to the basket from the bicycle when the latter is being propelled in usual manner.

As best seen in Figures 3 and 4, the top strap 1 forming the rim of the basket, and which stands in a substantially vertical plane, at its center, is twisted into a horizontal, flat head 10 that is perforated at 11 to provide a hole for the clamp bolt S'.

The two cross straps 7 and 8 are each formed at one of their ends with a hook, as 12 and 13, which hooks project to the rear and are adapted to fit over the handle-bar H.

Beneath the basket B, I employ a bracing-yoke, preferably of inverted U-shape, which is complementary to the front fork F of the bicycle, and comprises two legs 14 and 15, one at each side of the wheel W. The lower ends of these legs are provided with bolt holes 16 to accommodate the axle-bolt A of the wheel W, and the integral, top bar 17 of the yoke is riveted to the underside of one of the bottom straps of the basket, as 4.

An inspection of the drawing will readily indicate the mode of attaching the basket to the bicycle, and it will be seen that the flat head 10 of the basket is inserted between the lugs L of the clamp sleeve on the handle bar, after which the clamp bolt S' is passed through the lugs and the head, and the nut N turned home to securely fasten the basket to the handle bar.

The two hooks 12 and 13, one at each side of the split sleeve, are fitted over the handle bar H and the ends of the hooks are turned down in close contact with the rear portion of the handle-bar. Thus, by means of the three fastening devices, spaced substantial distances apart, a wide bearing is provided for supporting the basket from the handle bar, and the basket is prevented from tilting laterally when a load is contained therein.

The comparatively long top bar 17 of the inverted U-shape bracing yoke also prevents lateral tilting or twisting of the basket, and the yoke, extending from the underside of the bottom of the basket, to the front axle A, forms a rigid brace and connection for supporting the basket and its contents. The bracing yoke is attached at its lower end, by passing the bolt-axle A through the bolt holes 16, when the wheel W is mounted in its fork, and then the nuts A' are turned home in usual manner.

Having thus fully described my invention, what I claim as new and desire to secure by Letters Patent is:—

1. A bicycle basket comprising a top bar having a flat perforated central head, a cross bar at each side of said head and hooks on said cross bars, and a bracing yoke attached to the bottom of the basket.

2. A bicycle basket comprising a top, vertically arranged strap having a central portion twisted into a horizontal plane and perforated to form a head for attachment to the clamp sleeve of a handle bar, a pair of flat straps located at opposite sides of said head and provided with end hooks for engagement with the handle-bar, and means for supporting the basket from the front axle of the bicycle.

3. A bicycle basket having a horizontal, perforated portion forming a head for attachment to the clamp-sleeve of a handle bar, a rigid cross strap at each side of said head, a hook at the end of each said strap for engagement with the handle bar, and an inverted U-shaped bracing yoke rigidly attached at the underside of the bottom of said basket and extending transversely of said cross straps, and said yoke having bolt holes at its ends for engagement with the front axle of the bicycle.

LEWIS V. AGEE.